(12) United States Patent
Furuhashi et al.

(10) Patent No.: US 12,211,519 B2
(45) Date of Patent: Jan. 28, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Kana Furuhashi, Kawasaki Kanagawa (JP); Yosuke Kondo, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/243,549

(22) Filed: Sep. 7, 2023

(65) Prior Publication Data

US 2024/0321313 A1    Sep. 26, 2024

(30) Foreign Application Priority Data

Mar. 24, 2023   (JP) .................................. 2023-048550

(51) Int. Cl.
   G11B 20/18   (2006.01)
(52) U.S. Cl.
   CPC ...... G11B 20/1833 (2013.01); G11B 20/1879 (2013.01); *G11B 2020/1843* (2013.01); *G11B 2020/185* (2013.01)
(58) Field of Classification Search
   None
   See application file for complete search history.

(56) References Cited

U.S. PATENT DOCUMENTS

| | | | |
|---|---|---|---|
| 7,158,058 B1 * | 1/2007 | Yu | H03M 5/145 341/59 |
| 7,167,330 B2 | 1/2007 | Elliott et al. | |
| 7,234,097 B1 * | 6/2007 | Feng | G11B 20/1833 714/781 |
| 7,865,802 B1 | 1/2011 | Feng et al. | |
| 10,504,550 B2 | 12/2019 | Maruyama et al. | |
| 2003/0135798 A1 * | 7/2003 | Katayama | G11B 27/036 714/710 |
| 2004/0151090 A1 * | 8/2004 | Suzuki | G11B 20/1217 |
| 2006/0227446 A1 * | 10/2006 | Elliott | G11B 20/10425 360/39 |
| 2006/0248427 A1 | 11/2006 | Katayama et al. | |
| 2007/0076873 A1 * | 4/2007 | Yamamoto | G11B 20/0021 380/228 |
| 2008/0170685 A1 | 7/2008 | Flake et al. | |
| 2009/0010117 A1 * | 1/2009 | Kobayashi | G11B 20/18 |

(Continued)

FOREIGN PATENT DOCUMENTS

JP   2019-153367 A   9/2019

*Primary Examiner* — Peter Vincent Agustin
(74) *Attorney, Agent, or Firm* — Maier & Maier, PLLC

(57) ABSTRACT

According to one embodiment, a magnetic disk device includes a read control system that extracts scrambled data from media data read from a medium and inspection data associated with a seed value at the time of write, generates inspection data for data extracted from the media data, obtains from the inspection data and inspection data extracted from the media data, a seed value associated with both, compares this seed value with the seed value expected by the controller, and evaluates, when the comparison result is a mismatch, the data as an error, whereas when match, descrambles the data extracted from the media data using the seed value.

4 Claims, 8 Drawing Sheets

(56) References Cited

U.S. PATENT DOCUMENTS

2011/0035539 A1\* 2/2011 Honda ................ G06F 11/1068
711/E12.001
2019/0279678 A1\* 9/2019 Maruyama ........... G11B 19/045

\* cited by examiner

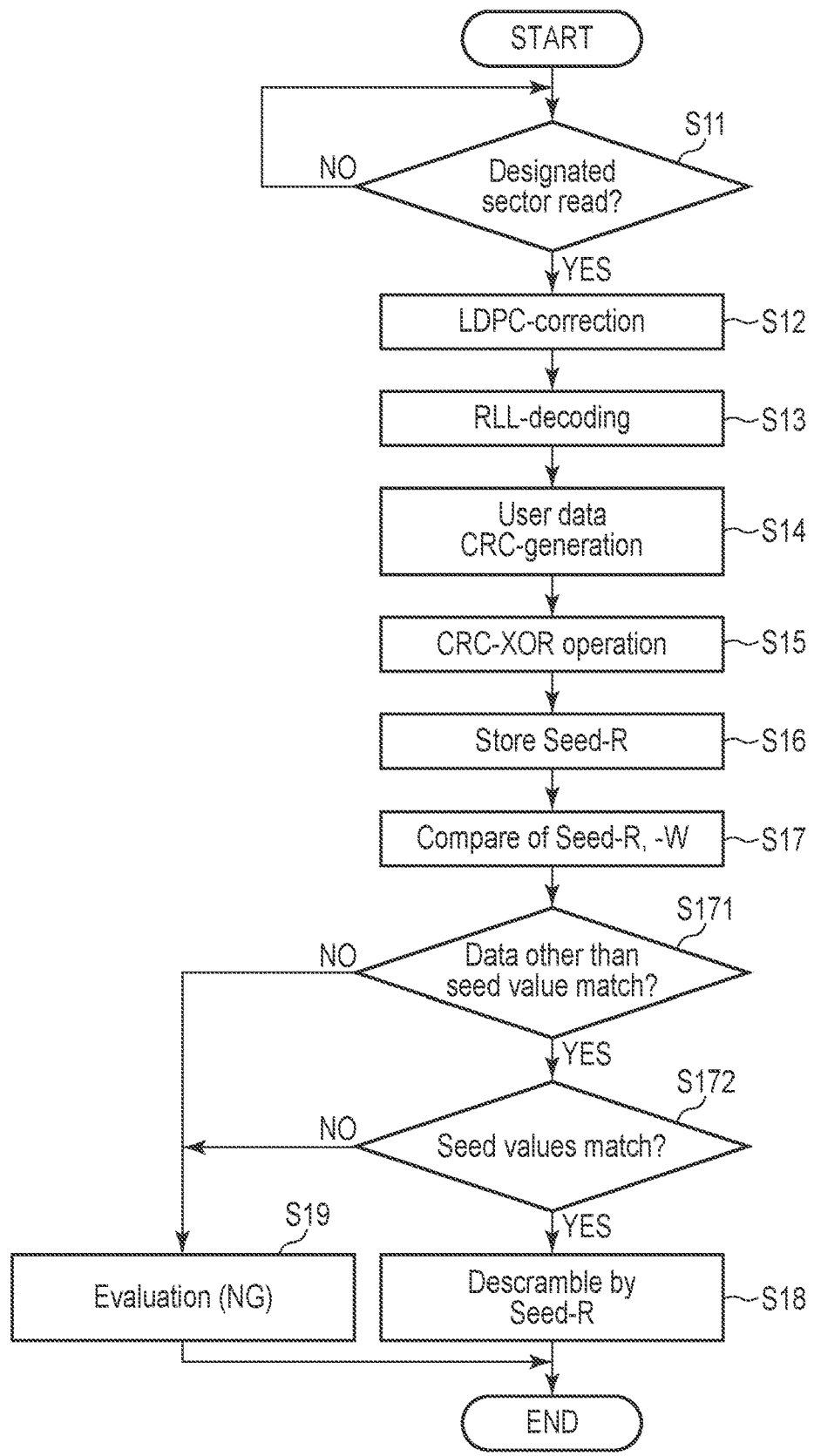
F I G. 2

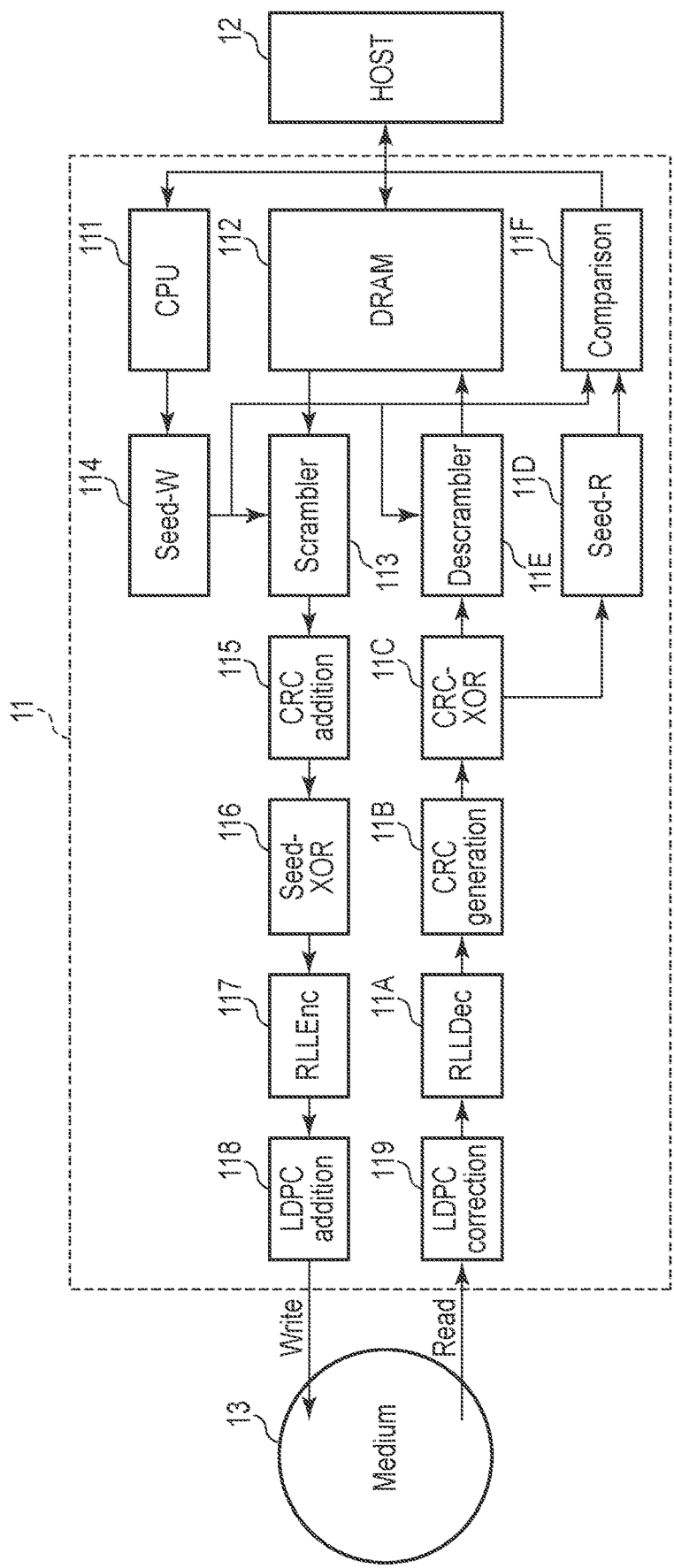
F I G. 6

MAGNETIC DISK DEVICE

CROSS-REFERENCE TO RELATED APPLICATIONS

This application is based upon and claims the benefit of priority from Japanese Patent Application No. 2023-048550, filed Mar. 24, 2023, the entire contents of which are incorporated herein by reference.

FIELD

Embodiments described herein relate generally to a magnetic disk device.

BACKGROUND

In magnetic disk devices, at the time of write of user data, cyclic redundancy check (CRC) data is generated as an error correction code from the user data. In this operation, a seed value (Seed2) specific to a sector of a write destination is given as part of the CRC data based on the scrambler seed value, which is sector-specific information of the write destination media and is given to the scrambler as a seed value. Specifically, the seed value (Seed2) information is given to the CRC data by performing an exclusive OR (XOR) operation on the CRC data and the seed value (Seed2). This operation is to check both the CRC and the seed value (Seed2) at the time of read, and to guarantee that the read sector does not contain any errors mixed therein and is the expected sector.

That is, at the time of write, a sector-specific seed value (Seed1) identical or unrelated to the CRC seed value (Seed2) is given to the user data and CRC, and a scrambler is applied, and then the write to the medium (magnetic disk) is carried out. At the time of read, the controller uses the seed value (Seed1) set during write, and cancel the scrambler of the user data and CRC. After that, the CRC check is performed on the user data and the controller's expected seed value (Seed2) is given for comparison.

BRIEF DESCRIPTION OF THE DRAWINGS

FIG. 2 is a flowchart illustrating a control operation of a read control system shown in FIG. 1.

FIG. 6 is a block diagram showing a configuration of a write/read control system of a controller used in a magnetic disk device according to the second embodiment.

DETAILED DESCRIPTION

Figure 1:
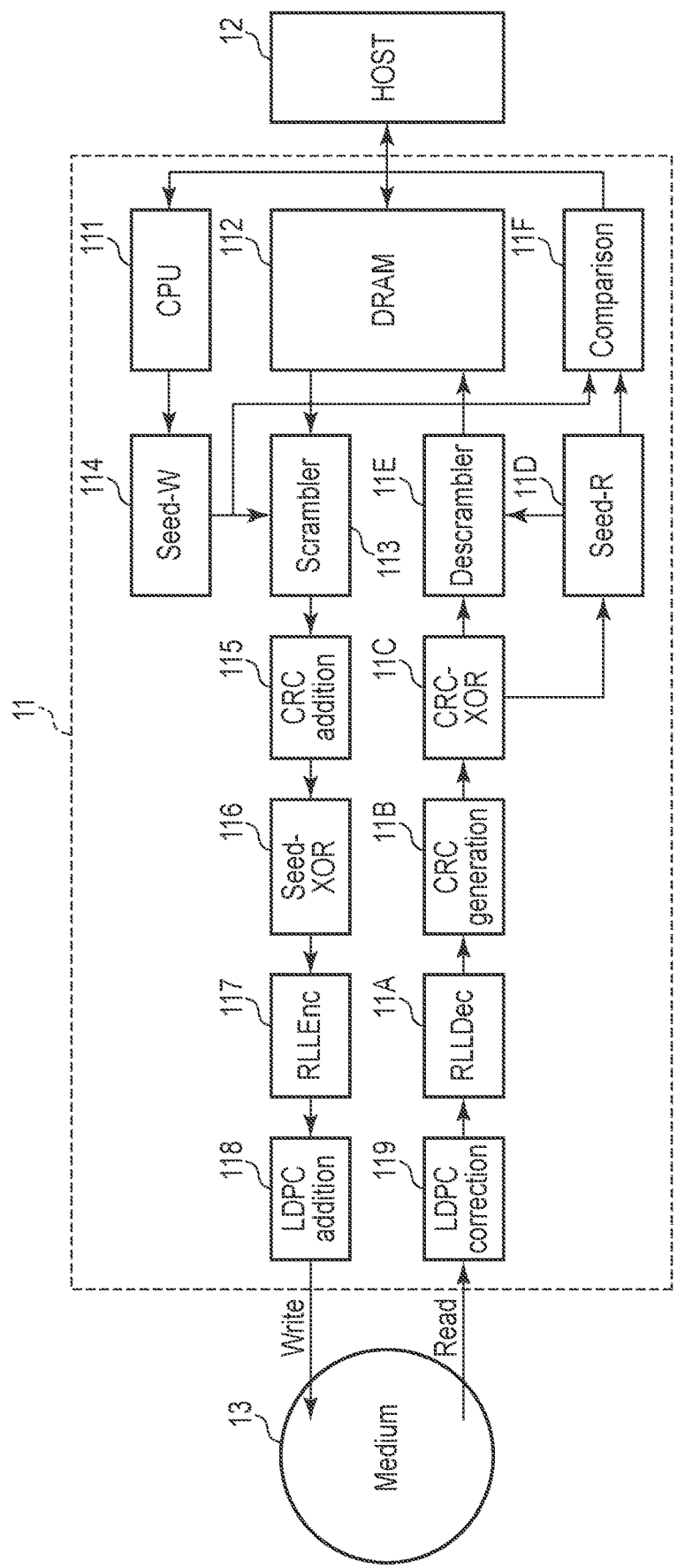
FIG. 1 is a block diagram showing a configuration of a magnetic disk device according to the first embodiment.

Embodiments will be described hereinafter with reference to the accompanying drawings.

In general, according to one embodiment, a magnetic disk device uses a magnetic disk as medium and comprises a write control system that writes data to a specified sector by a controller and a read control system that reads data from a specified sector by the controller. The write control system which, at a time of write of the data to the sector of the medium, scrambles the data using a seed value specific to the sector of a write destination indicated in a predetermined scrambler seed, generates inspection data for error detection from the scrambled data, performs an association process for associating the seed value used for the scrambling with a portion of the inspection data, add the inspection data after the association process to the scrambled data and writes the scrambled data. The read control system extracts the scrambled data and the inspection data from media data read from the medium, generates inspection data for the data extracted from the media data, obtains a seed value from the inspection data and the inspection data extracted from the media data, compares the seed value with the seed value specific to the sector of a read destination indicated in a scrambler seed expected by the controller, evaluates a result of comparison indicates mismatching as an error, and descrambles, when the result indicates matching, the user data extracted from the media data using either one of the seed value obtained from the media data and the seed value expected by the controller.

The following is a description of the embodiments with reference to the drawings. The disclosure is only an example, and the invention is not limited by the contents described in the following embodiments. Variations readily conceivable by those skilled in the art are naturally included in the scope of the disclosure. For the sake of clarity of explanation, in the drawings, the size, shape, etc., of each part may be schematically represented by changing the size, shape, etc., of each part with respect to the actual implementation. In several drawings, corresponding elements may be marked with the same reference numerals and detailed explanations may be omitted.

First Embodiment

FIG. 1 is a block diagram showing a configuration of a magnetic disk device according to the first embodiment. FIG. 1 shows a controller 11 which includes a write control system and a read control system. The controller 11 controls the write and read of user data by specifying a sector of a magnetic disk to be used as medium. Although the details are not shown in the figure, a central processor unit (CPU) 111 executes the control of temporarily storing user data from a host system (hereinafter referred to as HOST) 12 in a dynamic random access memory (DRAM) 112, writing data to a predetermined sector of a medium (magnetic disk) 13 through the write control system by a write command, and reading data from a predetermined sector of the medium 13 through the read control system by a read command.

The write control system reads temporarily stored user data from the DRAM 112 and sends it to a scrambler 113. The scrambler 113 scrambles the user data based on the sector-specific seed value (hereinafter referred to as the write seed value Seed-W) of the write destination indicated in the scrambler seed stored in a scrambler seed storage unit 114.

The user data scrambled by the scrambler 113 is sent to a CRC addition unit 115. The CRC addition unit 115 generates CRC data, which is inspection data for error detection, from the scrambled user data and adds it to the user data.

The CRC data-added user data is sent to a seed value exclusive logical OR (XOR) operation unit (Seed-XOR) 116. The seed value XOR operation unit 116 performs an XOR operation between the write seed value from the write seed value storage unit 114 and the user data+CRC data from the CRC addition unit 115. This XOR operation is performed to associate the seed value with the CRC data. The CRC data calculated in the seed value XOR operation unit 116 is RLL-encoded in an RLL encoder (RLLEnc) 117, and a low-density parity check (LDPC) code is added thereto in the LDPC addition unit 118, and then the data is written to the medium 13 as media data.

In the read control system, the data (media data) read from the medium 13 is sent to an LDPC correction unit 119. The LDPC correction unit 119 corrects read errors based on the LDPC code added to the media data.

The media data that has been subjected to the read error correction is RLL-decoded by an RLL decoder (RLLDec) 11A, thereby obtaining user data+CRC data before write. Of these, the user data is sent to a CRC generation unit 11B, and the CRC data is sent to a CRC-XOR operation unit (CRC-XOR) 11C.

The CRC generation unit 11B generates CRC data from the RLL-decoded user data and sends it to the CRC-XOR operation unit 11C. The CRC-XOR operation unit 11C performs exclusive-OR operation (XOR) between the CRC data generated from the user data before the cancelling of scrambling and the CRC data that has been RLL-decoded by the RLL decoder (RLLDec) 11A, and thus calculates out the read seed value (Seed-R). The calculated read seed value is sent to a seed value storage unit 11D and the user data is sent to a descrambler 11E.

Here, the read seed value (Seed-R) stored in the seed value storage unit 11D is sent to a comparison unit 11F. The comparison unit 11F compares the write seed value (Seed-W) read from the scrambler seed storage unit 114 on the write side and the read seed value (Seed-R) stored in the seed value storage unit 11D on the read side, with each other.

In this comparison, if they match each other, it is judged that the sector expected by the CPU 111 has been read, and if they do not match, it is judged that the read has not been performed correctly (error). If they do not match, the type of the error is estimated according to the location where the difference there between occurred. For example, if values other than the seed value part do not match, then it is determined that a miscorrection has occurred, and if values other than the seed value part match, then the possibility of sector misalignment is considered.

The descrambler 11E cancels the scrambling (descrambles) of the user data based on the read seed value (Seed-R) read from the seed value storage unit 11D when the comparison unit 11F determines that the write seed value and the read seed value (Seed-R) match each other. The descrambled user data is output to the HOST 12 through the DRAM 112.

Figure 3:
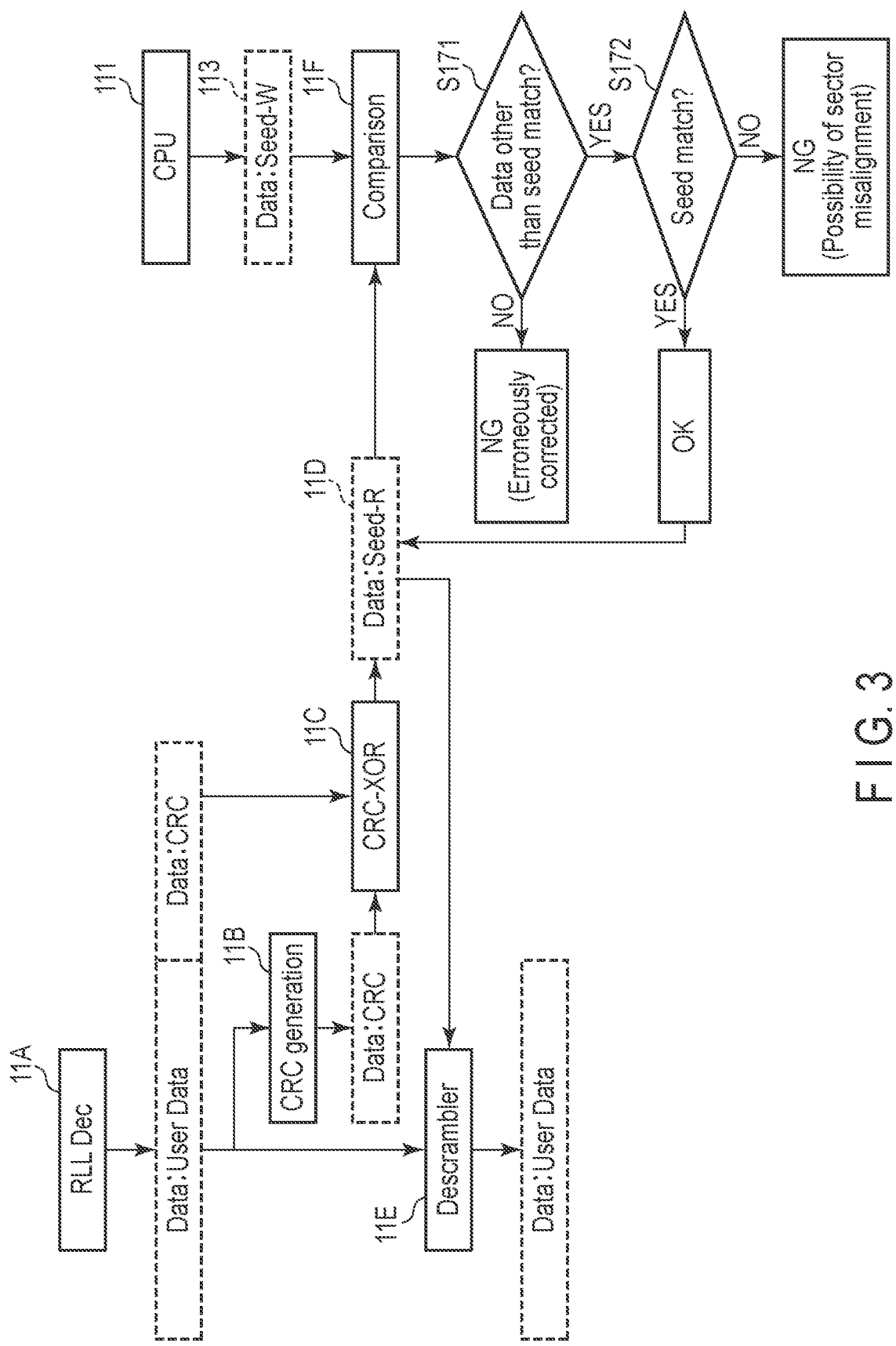
FIG. 3 is a conceptual diagram for illustrating the control operation shown in FIG. 2.

FIG. 2 is a flowchart showing the control operation of the read control system shown in FIG. 1, and FIG. 3 is a conceptual diagram illustrating the control operation shown in FIG. 2.

In the first example, when media data is read from a designated sector by instruction of the read sector (step S11), the read media data is LDPC-corrected (119, step S12), and RLL-decoded, thus obtaining user data+CRC data (11A, step S13). Here, the CRC data of the user data is generated (11B, step S14), and then an exclusive OR (XOR) between the CRC data generated from the user data and the RLL-decoded CRC data is computed, and the read seed value (Seed-R) associated with the CRC data is acquired (11C, Step S15). The read seed value (Seed-R) is stored (11D, Step S16). Subsequently, the read seed value (Seed-R) is compared with the write seed value (Seed-W) (11F, step S17). In this comparison, by utilizing the fact that the seed value is part of the CRC data, it is judged whether or not data other than the seed value match (step S171). For example, in the case where the CRC data is 80 bits and the seed value is 20 bits, even after the XOR operation of the CRC data and the seed value, the 60-bit part of the CRC data remains the unchanged value. This 60-bit part is regarded as a non-seed value, and is compared with data other than the read seed value (Seed-R) and data other than the write seed value (Seed-W). Here, if the data other than the seed value do not match (NO), the data is judged to be erroneously corrected (NG) and re-read. When the data other than the seed value match (YES), it is judged whether or not the seed values match (step S172). When the seed values do not match (NO), it is determined that the read location may be misaligned with respect to the sector (NG) and the data re-read. On the other hand, when the seed values match (YES), it determines that the read is normal, and the user data is descrambled by the read seed value (Seed-R) (11E, step S18), and output to the HOST 12 through the DRAM 112 (step S19).

Here, during the manufacturing process and evaluation of magnetic disk devices, the scrambler seed expected for the read may be changed from the scrambler seed used for the write.

With respect to such a situation, the embodiment is configured as follows. That is, in the read control system, the scrambled user data is extracted from the media data read from the medium and the CRC data that is subjected to XOR operation with the seed value at write time is extracted. Then, the CRC data for the user data extracted from the media data is generated, and this CRC data and the CRC data extracted from the media data are subjected to the XOR operation, to acquire a seed value. This seed value is compared with the seed value expected by the controller. When the comparison result indicates a mismatch, the data is evaluated as an error, and when the comparison result indicates a match, the data extracted from the media data is descrambled by using the seed value resulting from the XOR operation.

Therefore, even if the seed value for descrambling is not given by the CPU 111 at the time of read, it is possible to estimate and evaluate for the read sector whether there has been a miscorrection or it is a sector misalignment other than the miscorrection. Thus, it is possible to correctly evaluate the read data even if the scrambler seed expected at the time of read has changed from the scrambler seed used at the time of write.

On the other hand, unlike the configuration of the above-described embodiment, with such a configuration that the seed value set at the time of write is used to descramble the user data and CRC data, and then a CRC check is performed on the user data and the seed value expected by the controller is given, for comparison, the following drawback arises. That is, when the scrambler seed expected at the time of read is changed from the scrambler seed used for the time of write, the seed value for the write cannot be set correctly at the time of the read. As a result, even if the data read from the sector is correctly processed up to the RLL decoding, the descrambling is not correctly performed, resulting in a CRC error. Thus, the CRC error occurs due to the failure to descrambling, and therefore it cannot be known as to whether the read data has been processed by a real miscorrection or there has been the occurrence of a sector misalignment. As described above, such a configuration entails a drawback of impairment of the reliability in the evaluation of the read data.

As explained above, in the present embodiment, the CRC data for user data extracted from media data is generated and a seed value is calculated by subjecting the CRC data and the CRC data extracted from the media data to XOR operation. Then, this seed value is compared with the seed value expected by the controller, and evaluated based on the comparison result. Thus, the seed value at write can be correctly set at the time of read. In this manner, the above-described drawback can be overcome by the above-explained effect.

According to the above-described configuration, even if a seed value for descrambling is not given by the CPU 111 at the time of read, it is still possible to estimate and evaluate whether there has been a miscorrection of the read sector or it has been a sector alignment other than the miscorrection. Thus, the reliability of the read data can be evaluated even if the scrambler seed expected at the time of read has changed from the scrambler seed used at the time of write.

Modified Example

Figure 4:
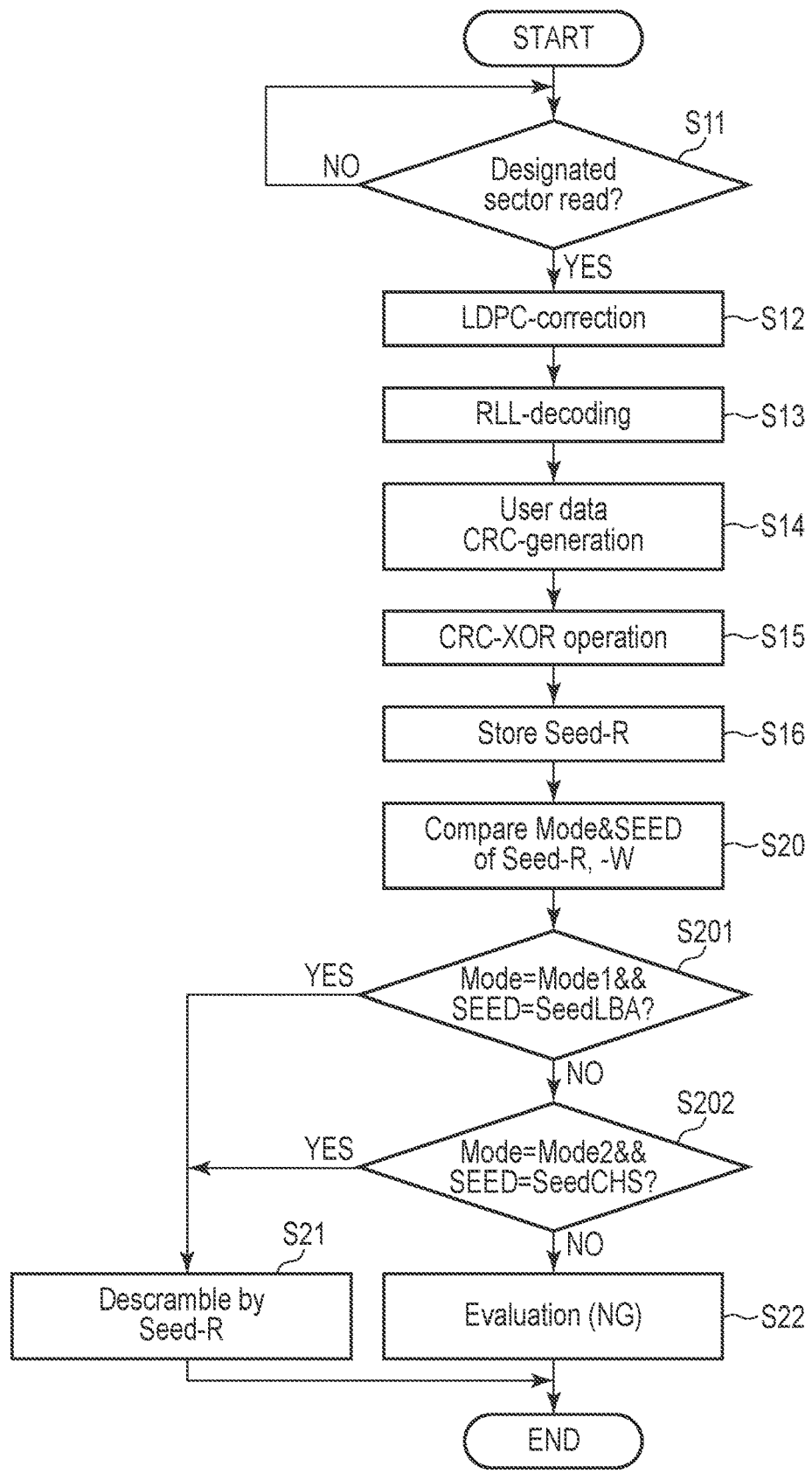
FIG. 4 is a flowchart illustrating a modified example of the control operation of the read control system shown in FIG. 1.
Figure 5:
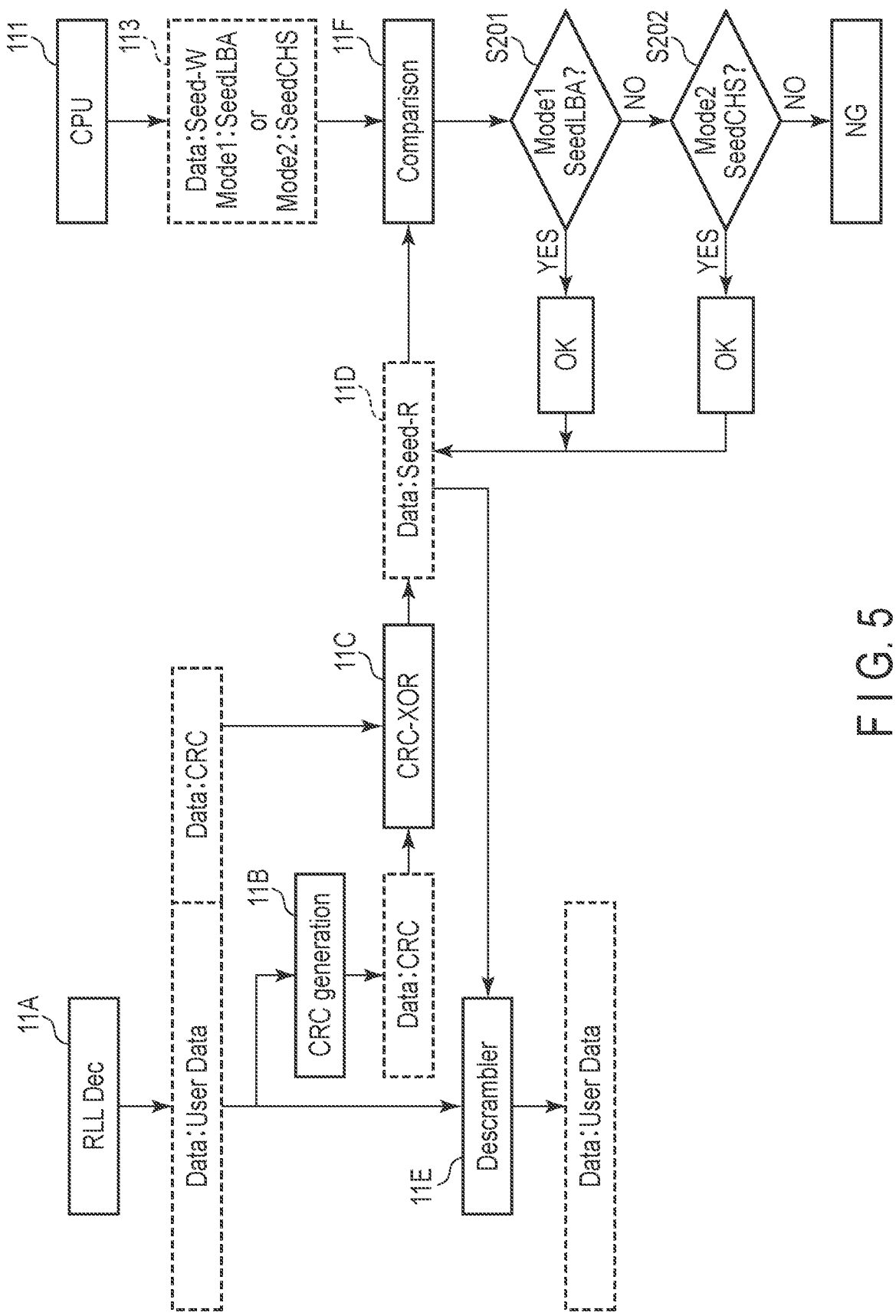
FIG. 5 is a conceptual diagram for illustrating the control operation shown in FIG. 4.

FIG. 4 is a flowchart showing a modified example of the control operation of the read control system shown in FIG. 1, and FIG. 5 is a conceptual diagram illustrating the control operation shown in FIG. 4. Note that in FIGS. 4 and 5, the same processing steps as those in FIGS. 2 and 3 are denoted by the same reference symbols, and the explanations thereof are omitted here.

This modified example focuses on that the value used as a seed value includes a plurality of sources. More specifically, the composition of data used as a seed value is regarded as a combination of a mode and the seed value specified by that mode, such as LBA mode and LBA seed value (Mode1: SeedLBA), CHS mode and CHS seed value (Mode2: SeedCHS) or the like. The CPU 111 determines a sector as to in which mode this data is a written at the time of read, sets what seed value to expect for each mode, and compares the set expected value with the read seed value (11F, step S20). In other words, in this comparison, it is determined as to whether the read seed value (Seed-R) is a combination of the LBA mode and the LBA seed value (Mode=Mode1: SEED=SeedLBA?) (Step S201). Here, if YES, the user data is descrambled while taking the read seed value (Seed-R) as the LBA mode and LBA seed value (11E, step S21). If NO in step S201, it is determined whether or not the read seed value (Seed-R) is a combination of the CHS mode and CHS seed value (Mode=Mode2: SEED=SeedCHS?) (step S202). Here, if YES, the user data is descrambled while taking the read seed value (Seed-R) as a combination of the CHS mode and the CHS seed value (11E, step S22).

As described above, in this modified example, the composition of the data used as the seed value is a combination of the mode and the seed value specified by the mode, and it is determined for to a sector as to in what mode the user data is written at the time of read, and is set as to what seed value is expected for each mode. Then, the set expected value is compared with the read seed value, and if they do not match, the error (the data was not corrected appropriately or is not of the expected sector) is returned to the CPU 111. With this configuration, even when a plurality of types of scrambler seeds are mixedly present (for example, sectors written with the CHS seed at the time of manufacture and sectors written with the LBA seed after manufacture are mixedly present), the original seed value can be acquired. Therefore, it is possible to determine as to whether or not the correction was made appropriately in the sector at the location where the sector is originally to be read.

In other words, for example, if a logical block address (LBA) is applied to a scrambler seed, it is necessary to apply LBAs in a brute force manner in order to restore that sector. For this reason, a cylinder head sector (CHS), or the like, which is easy to predict, may be applied as a scrambler seed.

However, if an incorrect scrambler seed is used at the time of read, the sector will result in a CRC error and must be read again. Under these circumstances, there has been a problem that sectors that use CHS as a scrambler seed and sectors that use LBA as a scrambler seed cannot be mixedly present.

As described above, according to the configuration of the above-described modified example, the data used as the seed value is formed as a combination of the mode and the seed value specified by the mode, and the user data is determined as to in which mode the sector was written at the time of read, and it is set as to what seed value is expected for each mode. Then, the set expected value and the read seed value are compared with each other, and if they do not match, the error is returned to the CPU 11, thus overcoming the above-described problem.

Second Embodiment

Figure 7:
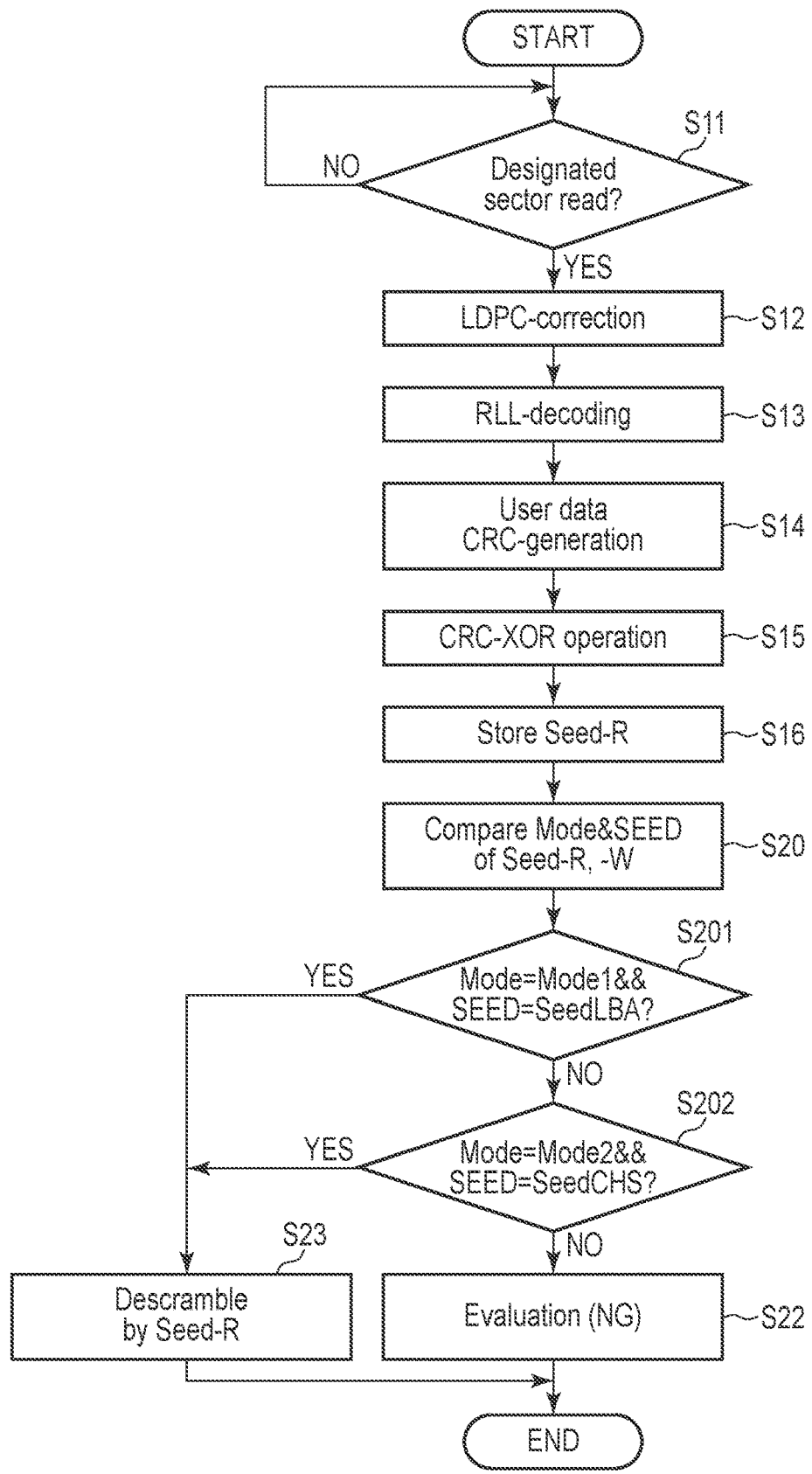
FIG. 7 is a flowchart illustrating a control operation of the read control system shown in FIG. 6.
Figure 8:
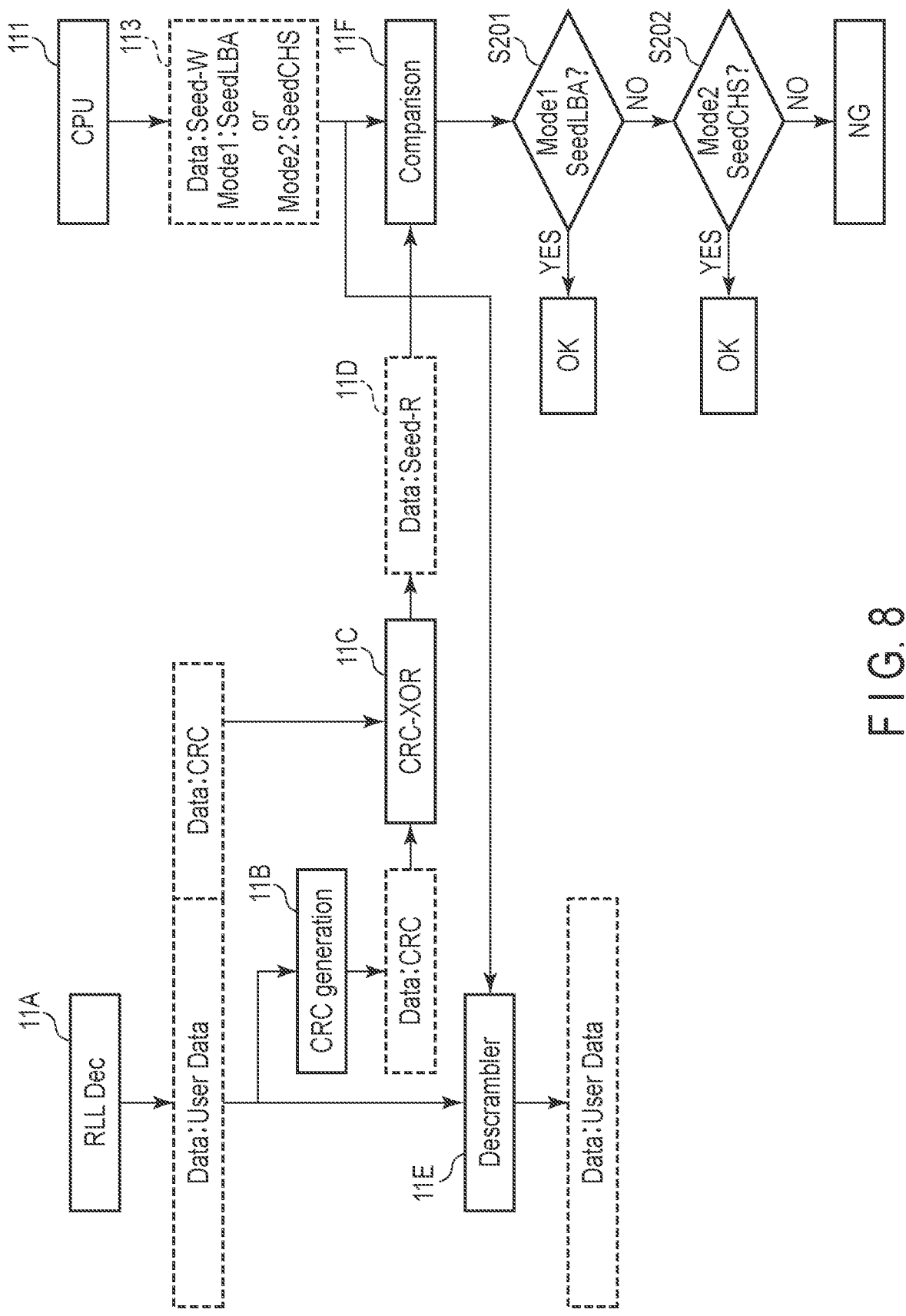
FIG. 8 is a conceptual diagram for illustrating the control operation of the read control system shown in FIG. 7.

Next, the second embodiment will be described with reference to FIGS. 6 to 8. Here, FIG. 6 is a block diagram showing the configuration of a write/read control system of a controller used in a magnetic disk device according to the second embodiment. FIG. 7 is a flowchart illustrating a control operation of the read control system shown in FIG. 6, and FIG. 8 is a conceptual diagram for illustrating the control operation of the read control system shown in FIG. 7. Note that in FIGS. 6 to 8, the same processing steps as those in FIGS. 1 to 5 are denoted by the same reference symbols, and the explanations thereof are omitted here.

In this embodiment, as in the modified example described earlier, the composition of the data used as the seed value is made as a combination of the mode and the seed value specified by the mode, such as a LBA mode and a LBA seed value (Mode1: SeedLBA), a CHS mode and a CHS seed value (Mode2: SeedCHS), etc. In the write control system, they are stored in the scrambler seed storage unit 114.

On the other hand, in the read control system, the CPU 111 determines a sector as to in which mode this data is written at the time of read, sets what seed value is to be expected for each mode, and compares the set expected value with the read seed value (11F, step S20).

In this embodiment, by the comparison, it is determined as to whether the read seed value (Seed-R) is a combination of the LBA mode and the LBA seed value (Mode=Mode1: SEED=SeedLBA?) (Step S201). If it is judged as YES, the read seed value (Seed-R) notifies to the CPU 111 that it is the LBA seed value for the LBA mode expected by the CPU 111, whereas if NO, it is determined as to whether the read seed value (Seed-R) is a combination of the CHS mode and the CHS seed value (Mode=Mode2: SEED=SeedCHS?) (Step S202). Here, if it is judged as YES, the read seed value (Seed-R) notifies to the CPU 111 that it is the CHS seed value for the CHS mode expected by the CPU 111, whereas if NO, it notifies to the CPU 111 that the evaluation is no good. If either one of the steps S201 and S202 is YES, the CPU 111 descrambles the user data with the seed value of the mode stored in the write seed value storage unit 114.

That is, in this embodiment, if the read seed value (Seed-R) is a combination of the LBA mode and the LBA seed value or that of the CHS mode and the CHS seed value in steps S201 and S202 (YES), the CPU 111 descrambles the user data, using not the read seed value, but the seed value of the mode specified by the CPU 111 (Seed-W), in parallel with the data processing of the CRC calculation (11E, step S23).

In this manner, the descrambling can be performed while performing the CRC calculation, thereby shortening the latency of data processing and achieving advantageous effects similar to those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk medium including sectors for write and read of data thereto/therefrom;
   a controller which controls the write and read of the data by specifying a sector on the medium;
   a write control system which, at a time of write of the data to the sector of the medium, scrambles the data using a seed value specific to the sector of a write destination indicated in a predetermined scrambler seed, generates inspection data for error detection from the scrambled data, adds the inspection data to the scrambled data, and performs an association process for associating the seed value used for the scrambling with a portion of the inspection data; and
   a read control system which extracts the scrambled data and the inspection data from media data read from the medium, generates inspection data for the data extracted from the media data, obtains a seed value from the inspection data and the inspection data extracted from the media data, compares the seed value with the seed value specific to the sector of a read destination indicated in a scrambler seed expected by the controller, evaluates a result of comparison indicates mismatching as an error, and descrambles, when the result indicates matching, the data extracted from the media data using either one of the seed value obtained from the media data and the seed value expected by the controller.

2. The magnetic disk device of claim 1, wherein
   the read control system estimates, when the result of comparing the seed value obtained from the read media data with the seed value expected by the controller indicates a mismatch, a type of error according to a location where a difference between the two occurred.

3. The magnetic disk device of claim 1, wherein in the comparing the seed value obtained from the read media data with the seed value expected by the controller, the read control system judges whether or not the data other than the seed value match by utilizing a fact that the seed value is part of the inspection data, and determines, when the data other than the seed values do not match, that the data is erroneously corrected, and further judges, when the data other than the seed values match, whether or not the seed values match, and determines, when the seed values do not match, that a read location may involve a sector misalignment, whereas when the seed values match, determines that the read is normal.

4. The magnetic disk device of claim 1, wherein
   the write control system adds, when the value used as the seed value includes a plurality of sources, a value indicating a source used at the time of write to the scrambled data processed to be associated with the inspection data, and
   the read control system obtains the seed value and the value indicating the source from the inspection data generated from the data extracted from the media data and the inspection data extracted from the media data, compares the source value and the seed value with the source value and the seed value expected by the controller, evaluates, when one of the source value and the seed value mismatches, as an error, whereas when they both match, descrambles the data extracted from the media data using the matched seed value.

* * * * *